United States Patent [19]
Suzuki et al.

[11] Patent Number: 5,701,533
[45] Date of Patent: Dec. 23, 1997

[54] MOVEABLE LENS BARRIER FOR A CAMERA WHICH REDUCES CAMERA SIZE

[75] Inventors: Tatsuya Suzuki, Tokyo; Hiroaki Miyazaki, Tsukui-gun, both of Japan

[73] Assignee: Olympus Optical Co., Ltd., Tokyo, Japan

[21] Appl. No.: 597,644

[22] Filed: Feb. 6, 1996

[30] Foreign Application Priority Data

Feb. 7, 1995 [JP] Japan ................................ 7-019593

[51] Int. Cl.⁶ .................................................. G03B 17/04
[52] U.S. Cl. .................................... 396/349; 396/448
[58] Field of Search ............................. 354/187, 288; 396/448, 534, 348, 439, 349

[56] References Cited

U.S. PATENT DOCUMENTS 5,508,769  4/1996  Inoue et al. ........................ 396/349

FOREIGN PATENT DOCUMENTS

6-102570  4/1994  Japan .

*Primary Examiner*—Safet Metajahic
*Assistant Examiner*—J. K. Han
*Attorney, Agent, or Firm*—Louis Weinstein

[57] ABSTRACT

A camera with a lens mount having an imaging lens and a barrier which is disposed on a camera body and which is shiftable between a closed position where the barrier covers a part of the lens mount and the entire front of the imaging lens and an open position where the barrier is clear of the front of the lens mount. When the barrier is at the closed position, the barrier allows the front of the lens mount to be partly exposed. The camera thus constructed achieves a minimum dimension in the width across the camera body including the barrier.

29 Claims, 6 Drawing Sheets

MOVEABLE LENS BARRIER FOR A CAMERA WHICH REDUCES CAMERA SIZE

BACKGROUND OF THE INVENTION

1. Field of the Invention

The present invention relates to a camera, and in particular to the structure of a barrier that protects an imaging lens of the camera.

2. Related Art Statement

A diversity of barrier structures have been proposed for camera application. For example, Japanese Patent Application Laid-open No. Hei-6-102570 has disclosed a collapsible-mount-type camera which, regardless of its compact design, avoids interference between a barrier and a lens mount when the barrier is closed.

Figure 12:
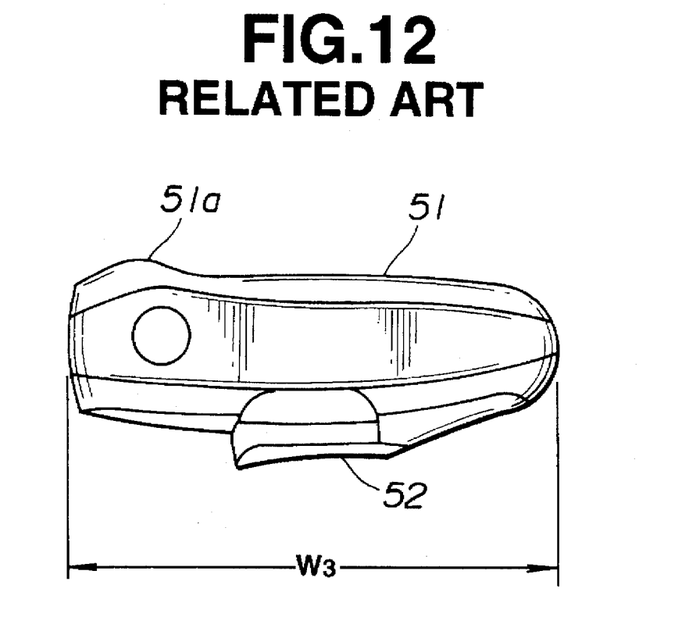
FIG. 12 is the top view showing the prior art collapsible-type camera with its barrier at a closed state.
Figure 13:
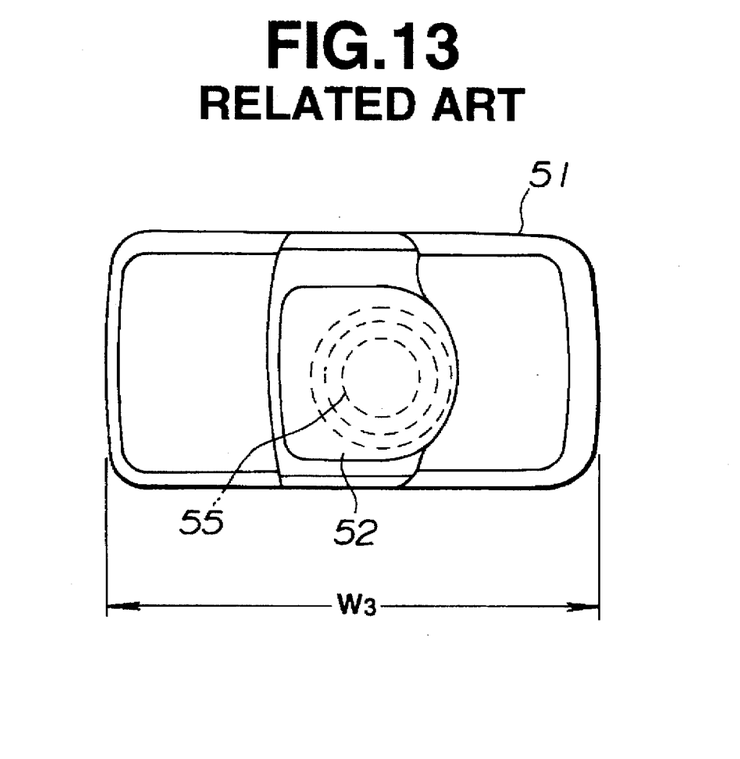
FIG. 13 is the front view showing the collapsible-type camera of FIG. 12 with its barrier at a closed state.
Figure 14:
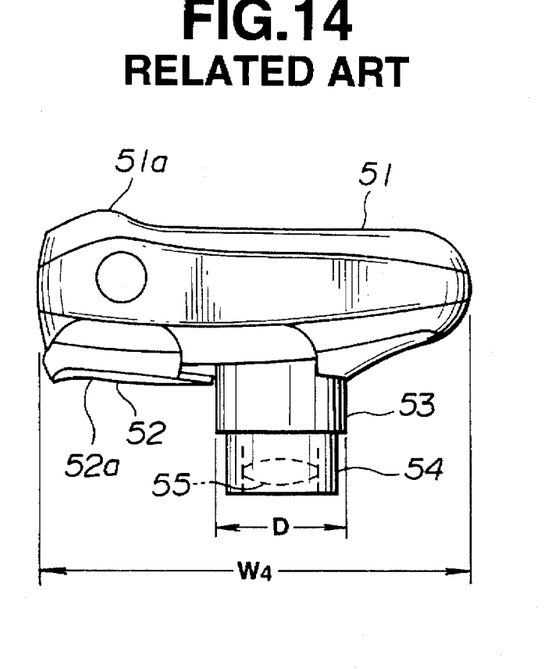
FIG. 14 is the top view showing the lens mount of the collapsible-type camera of FIG. 12, wherein the camera is ready for use with its barrier at an open state.
Figure 15:
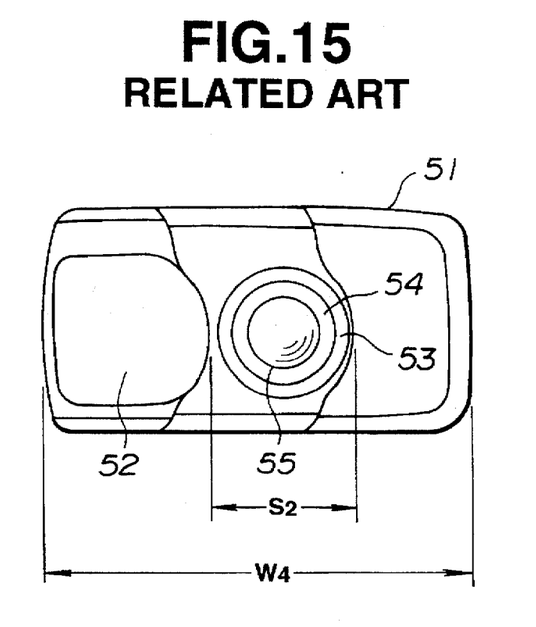
FIG. 15 is the front view showing the collapsible-type camera of FIG. 12, wherein the camera is ready for use with its barrier at an open state.

FIGS. 12 through 15 show the open and closed states of the barrier of a prior art collapsible-type camera. FIGS. 12 and 13 are respectively a top view and a front view of the closed barrier with the camera not ready for use. FIGS. 14 and 15 are respectively a top view and a front view of the open barrier with the camera now ready for use.

In the prior art camera as shown, the camera body 51 is provided with a slidable barrier 52. The camera body 51 is also provided with a collapsible or retractable lens mount 53, which in turn retractably supports a lens mount 54 that holds an imaging lens 55.

In a not-ready state, the lens mounts 53, 54 are collapsed to their retracted positions and are accommodated there. As shown in FIGS. 12 and 13, the barrier 52 is now at its closed position in which the barrier 52 covers all of the imaging lens 55 and the lens mounts 53, 54.

In a ready-for-use state, on the other hand, the barrier 52 is opened, and then slid to its open position at which the barrier 52 is clear of the lens mounts 53, 54 as shown in FIGS. 14 and 15. The lens mounts 53, 54 and the imaging lens 55 are projected to their projected positions where the camera is ready for use or photographing.

Suppose that in the prior art camera the lens mount 53 projected out of the camera body 51 has a diameter of D and that a distance over which the barrier 52 has slid is S2, the following dimensional relationship has to be maintained to shift from the not-ready state to the ready-for-use state or vice versa:

$$S2 \geq D \quad (1)$$

In the collapsible-type camera disclosed by the above cited Japanese Patent Application Laid-open No. Hei-6-102570, the barrier 52 is sized so that the slide distance S2 satisfies the equation (1), namely, the slide distance S2 is at least equal to or greater than the diameter D of the lens mount.

To improve fitness-into-hand characteristic of the camera during photographing, the grip portion 51a of the camera body 51 and the grip portion 52a of the barrier 52 at its open position should agree in their alignment. To this end, the width W3 across the camera body 51 and the width W4 across the camera body at its barrier side, namely the length from the right-hand end of the camera body to the left-hand end of the barrier 52 with the barrier 52 at its open position, should be equal to each other as follows:

$$W3 = W4 \quad (2)$$

The width W4 of the camera barrier side with the barrier at its open position is a dimension that results when the barrier 52 is slid by a distance equal to or longer than the lens mount diameter D. The camera body width W3 that has to agree with the width W4 does not necessarily meet minimum-size design requirement, and a wider camera body width W3 may result depending on the open position of the barrier 2. This presents difficulty designing a compact camera.

OBJECT AND SUMMARY OF THE INVENTION

The present invention has been developed to resolve the above problem, and it is an object of the present invention to provide a camera equipped with a barrier, wherein the width of the camera body has a dimension that satisfies the minimum-size design requirement.

It is another object of the present invention to provide a camera, wherein although a compact design implemented leaves a lens mount partly exposed even with a barrier at its closed position, the exposed portion is not recessed from the outline of the body, is free from ingress of foreign matter, and is turned into an accent in camera design rather than aesthetically impairs the appearance of the camera.

The first camera of the present invention comprises an imaging lens and a barrier that is shiftable between one position at which the barrier covers a lens mount holding the lens and the other position at which the barrier does not cover the lens mount, whereby the barrier, at its closed position, allows the lens mount to be partly exposed.

In the second camera of the present invention, according to the first camera, the barrier at its closed position covers entirely, at least, the imaging lens on the front of the lens mount and a portion of the lens mount out of the barrier is provided with a projection.

These and other features and advantages of the present invention will be readily apparent from the drawings and the discussion that follows.

DETAILED DESCRIPTION OF THE PREFERRED EMBODIMENTS

Referring now to the drawings, the embodiments of the present invention are discussed.

Figure 1:
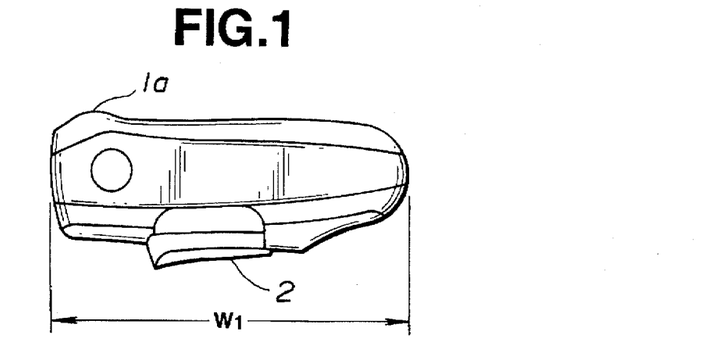
FIG. 1 is a top view showing the collapsible-type camera with its barrier at a closed state, according to a first embodiment of the present invention.
Figure 2:
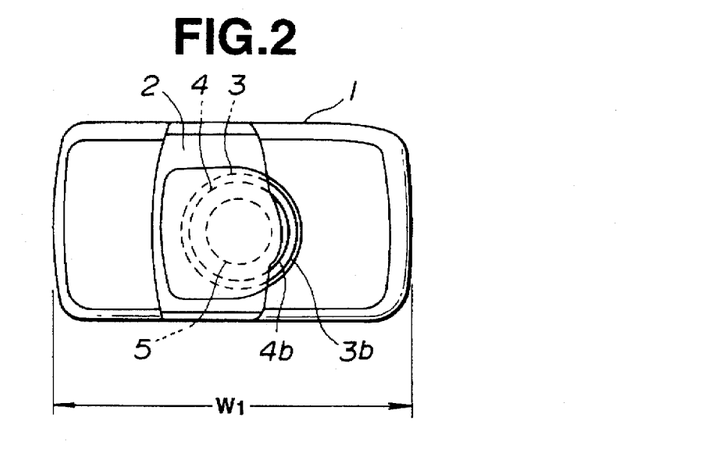
FIG. 2 is a front view showing the collapsible-type camera of FIG. 1 with its barrier at a closed state.
Figure 3:
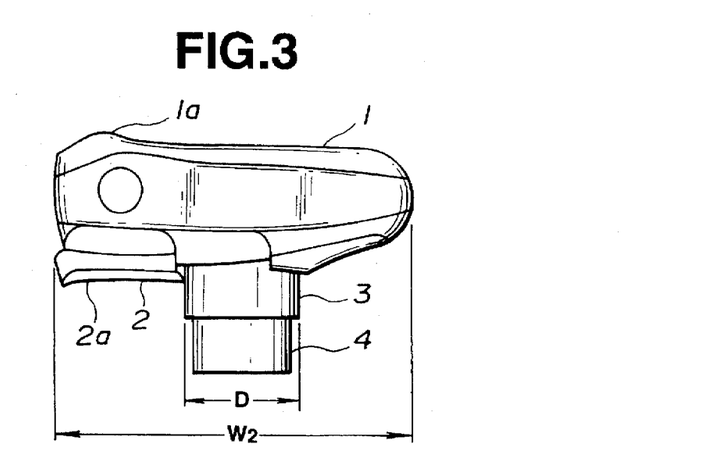
FIG. 3 is a top view showing the lens mount of the collapsible-type camera of FIG. 1, wherein the camera is ready for use with its barrier at an open state.
Figure 4:
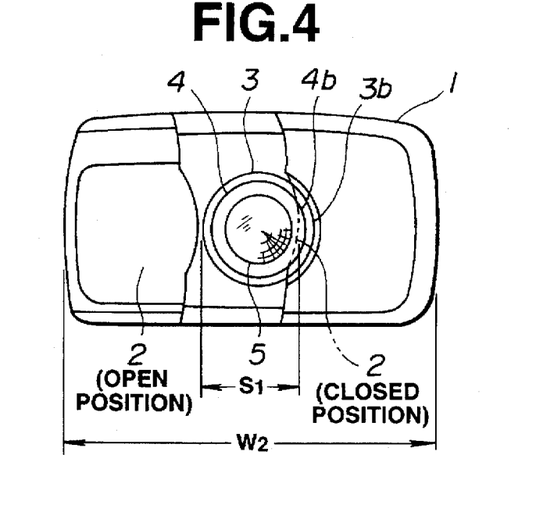
FIG. 4 is a front view showing the collapsible-type camera of FIG. 1, wherein the camera is ready for use with its barrier at an open state.

FIGS. 1 and 2 are respectively the top and front views of the barrier of the collapsible-type camera according to the first embodiment of the present invention, wherein the camera is collapsed and not ready for use with its barrier at a closed state. FIGS. 3 and 4 are the top and front views of the camera which is ready for use with the barrier at an open state.

In the collapsible-type camera of this embodiment, as shown, a camera body 1 is provided with the barrier 2 that is slidably shiftable between its open position and closed position. The camera body 1 is also provided with a collapsible or retractable lens mount 3, which in turn supports retractably a lens mount 4 that holds an imaging lens 5 on its front.

In a not-ready state in which no photographing takes place, the lens mounts 3, 4 are collapsed to their retracted positions and accommodated there in the camera body 1 as shown in FIGS. 1 and 2. The barrier 2 is then moved to its closed position that is determined by a stopper disposed on the camera body 1 side. Although at its closed position, the barrier 2 entirely covers the lens front of the imaging lens 5, the barrier 2 does not fully cover the lens mounts 3, 4 with parts of front portions 3b, 4b of the lens mounts 3, 4 left exposed.

In a ready-for-use state as shown in FIGS. 3, 4, the barrier 2 is shifted to its open position to allow the imaging lens 5 to be exposed and not to interfere with the retraction and projection action of the lens mounts 3, 4. The lens mounts 3, 4 and the imaging lens 5 are moved to their projected positions, at which photographing takes place.

Suppose now that in the camera of this embodiment the maximum diameter of the lens mount projected out of the camera body 1, namely the outer diameter of the lens mount 3 is D and that the slide distance of the barrier 2 is S1. By exposing partly the lens mount with the barrier 2 at its closed position, the slide distance S1 is allowed to be shorter than the lens mount diameter by a length according to the exposure.

$$S1 \leq D \tag{3}$$

The slide distance S1 is thus shorter than the slide distance S2 the prior art barrier needs as expressed in the equation (1).

Suppose now that the width across the camera with the barrier at its closed state, namely the width of the camera body is W1 and that the width across the camera at its barrier side to the end of the barrier with the barrier at its open state is W2. To achieve improved fitness-into-hand characteristic of the camera during photographing, the grip portion 1a at the camera body 1 side and the grip portion 2a of the barrier 2 side are roughly aligned, and the following relationship is established.

$$W1=W2 \tag{4}$$

Since in the collapsible-type camera of this embodiment, the slide distance S1 of the barrier 2 is designed to be shorter than that of the prior art camera, the widths W1, W2 of the camera are allowed to be accordingly shorter than the widths W3, W4 of the prior art camera while the fitness-in-hand characteristic during photographing is maintained and the imaging lens 5 is still protected from ingress of dust. This arrangement allows a compact design to be implemented.

The barrier 2 with the shortened slide distance still provides protection to the imaging lens.

If the imaging lens is a high-magnification zooming one with its large lens mount diameter, the prior art camera will have to be accordingly large with its width increased to accommodate the large lens diameter. In the camera of this embodiment, however, an enlarged portion in the size of the front imaging lens is simply covered by an increase in the slide distance of the barrier. It is enough to enlarge the width of the camera by a size corresponding to the increase in the slide distance. The first embodiment is particularly advantageous, because the use of a large diameter lens mount does not result in a bulky camera design.

In the collapsible-type camera of the first embodiment, the lens mounts are partly exposed to the outside with the barrier at its closed state. Since the exposed portions 3b, 4b of the lens mounts naturally remain recessed from the surface of the barrier 2 or the camera body 1, foreign matter may ingress into the exposed portions 3b, 4b or the exposed portions 3b, 4b may be aesthetically unacceptable. The second embodiment of the present invention resolves these inconveniences. According to the second embodiment of the present invention, the exposed portions of the lens mounts are raised near to the openings of the barrier or the camera body and furthermore the raised portions are configured to be an accent in camera design.

Figure 5:
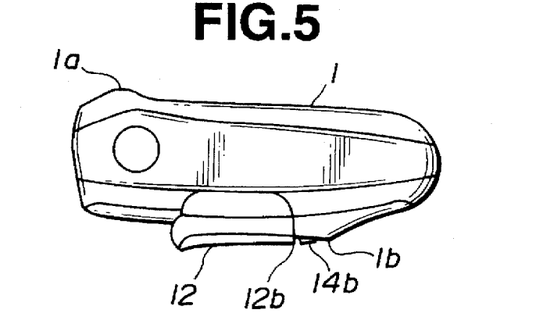
FIG. 5 is a top view showing the collapsible-type camera with its barrier at a closed state according to a second embodiment of the present invention.
Figure 6:
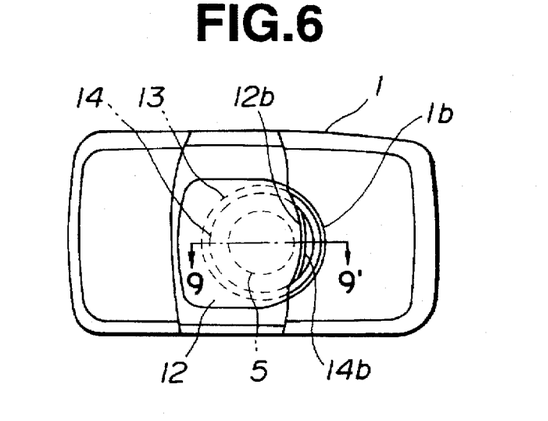
FIG. 6 is a front view showing the collapsible camera of FIG. 5 with its barrier at a closed state.
Figure 7:
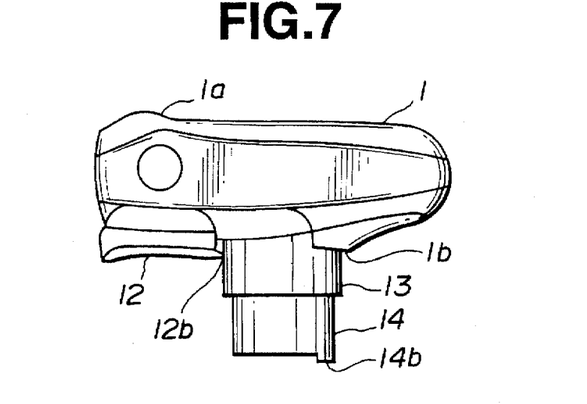
FIG. 7 is a top view showing the lens mount of the collapsible-type camera of FIG. 5, wherein the camera is ready for use with its barrier at an open state.
Figure 8:
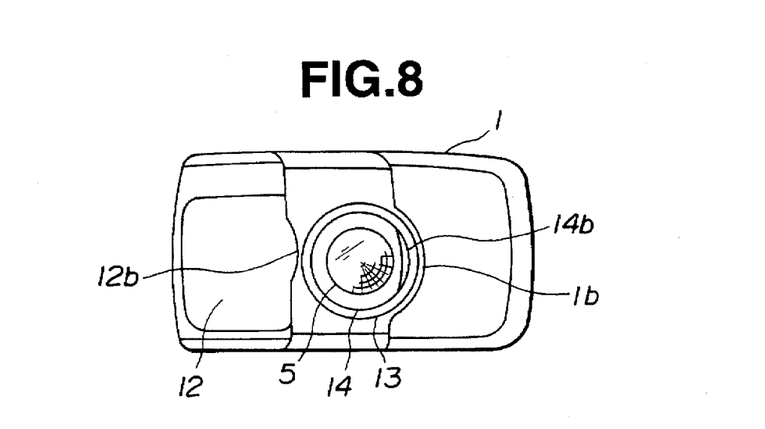
FIG. 8 is a front view showing the lens mount of the collapsible-type camera of FIG. 5, wherein the camera is ready for use with its barrier at an open state.
Figure 9:
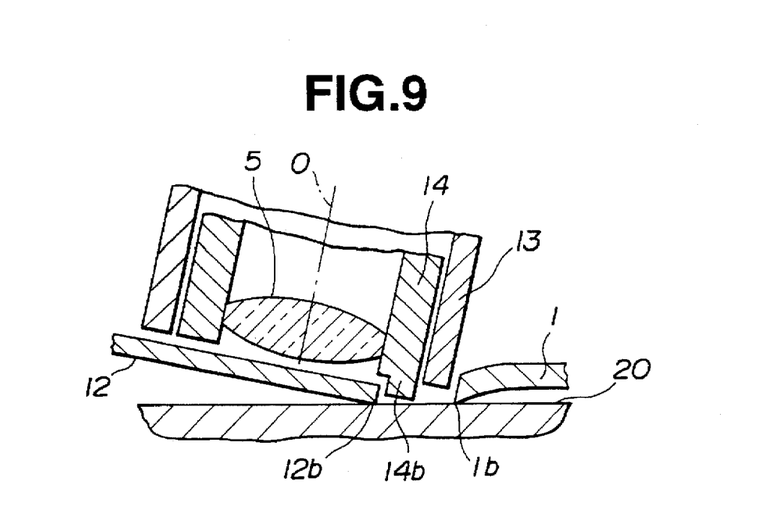
FIG. 9 is a cross-sectional view taken along line 9–9' in FIG. 6, showing the camera that touches down on a flat surface when subjected to a free fall.

FIGS. 5 and 6 are top and front views of the collapsible-type camera, wherein the camera is not ready for use at its collapsed state with its barrier at a closed position. FIGS. 7 and 8 are top and front views of the collapsible-type camera, which is now ready for use with the barrier at its open position. FIG. 9 is the cross-sectional view taken along line A–A' in FIG. 6, showing the not-ready-for-use camera that touches down on a flat surface 20 when the camera is allowed to fall freely with its barrier looking down.

As shown in each of the above figures, the collapsible-type camera of this embodiment, like the camera of the first embodiment, is provided with a barrier 12 that can slide between the open position on the left-hand side and the closed position on the right-hand side. The camera body 1 is also provided with a collapsible or retractable lens mount 13, which in turn retractably supports a lens mount 14 which holds an imaging lens 55 on its front and with which a projection 14b is integrally formed.

During not-ready-for-use state or non-photographing state, the lens mounts 13, 14 are collapsed to their retracted positions within the camera body 1 as shown in FIGS. 5 and 6. The barrier 12 is moved to its closed position which is determined by a stopper or the like formed on the camera body 1. With the barrier 12 at its closed position, the front end lens side of the imaging lens is fully covered while the front end of the projection 14b of the lens mount 14 remains exposed.

As shown in the cross-sectional view in FIG. 9, the front end of the projection 14b of the lens mount 14 is slightly inwardly recessed from the line connecting, or the plane formed by, the ridge 12b at the end of the barrier 12 and the ridge 1b at the end of the camera body 1. Even when the camera is put on the flat surface 20 such as a table top with the barrier closed and looking downward, the projection 14b of the lens mount 14 is protected and no external force is directly exerted onto the lens mount 14.

During ready-for-use state, the barrier 12 opens the lens front of the imaging lens 5 and is set to its open position to be clear of the retraction and projection path of the lens mounts 13, 14. Then, the lens mounts 13, 14 and the imaging lens 15 are projected to their imaging positions.

In the collapsible-type camera of this embodiment as described above, during not-ready-for-use state with the barrier 12 at its closed position, the projection 14b of the lens mount 14 is exposed in the gap between the barrier 12 and the camera body 1 in a manner that the projection 14b is not projected out of the outline of the barrier 12 and the camera body 1. Since the gap is not recessed, no foreign matter is allowed to ingress into the gap.

Even if the camera is accidentally dropped with the barrier closed and looking downward, the lens mount 14 is protected from a resulting impact.

As already described, the exposed projection 14b of the lens mount 14 serves as an accent in camera design that may be eye catching. The eye-catching effect will be enhanced even more by pigmenting the projection 14b in a color different from that of the barrier 12 and the camera body 1. Since no separate component is required as the projection 14b, cost reduction is achieved.

In the collapsible-type camera of this embodiment, the slide distance of the barrier 12 is so determined that the lens mount is partly exposed with the barrier at its closed position. Like the camera of the first embodiment, the width across the camera with the barrier at its closed position, namely the width of the camera body, is allowed to be short in design compared to the prior art camera.

The camera of this embodiment has the projection 14b on the lens mount 14 only. Providing a projection on the lens mount 13 as well to meet camera design and functional requirements is perfectly acceptable.

Discussed next is an alternate example of the second embodiment in connection with the projection of the lens mount in the collapsible-type camera.

In the collapsible-type camera of the second embodiment, the projection 14b of the lens mount 14 is integrally formed with the structure of the lens mount 14. The projection of the lens mount of this alternate example is of a structure that is fitted into a lens mount.

Figure 10:
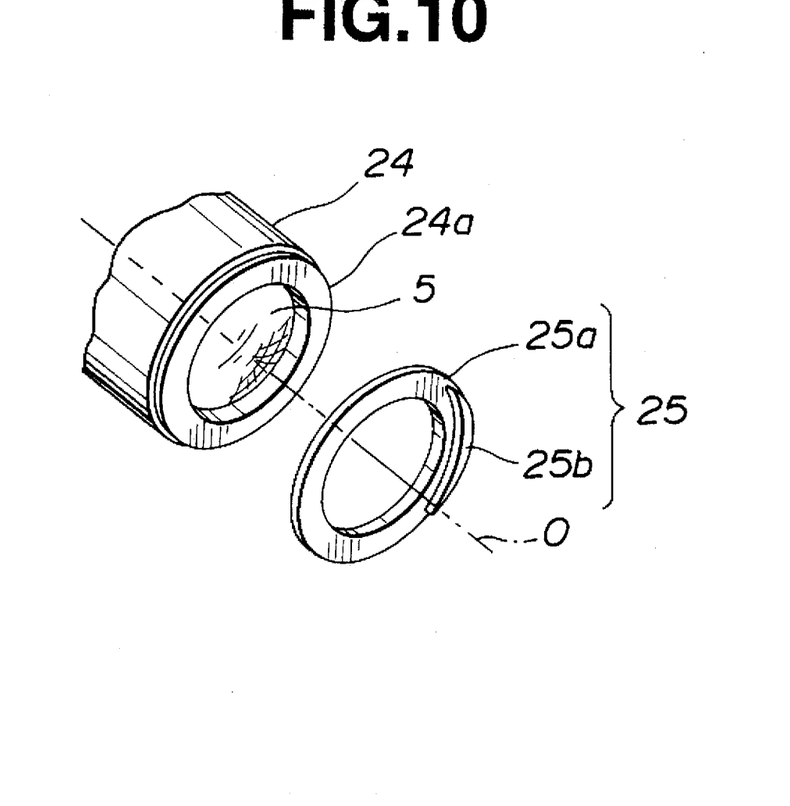
FIG. 10 is an exploded perspective view of the lens mount according to an alternate example of the second embodiment of the collapsible-type camera of FIG. 5.
Figure 11:
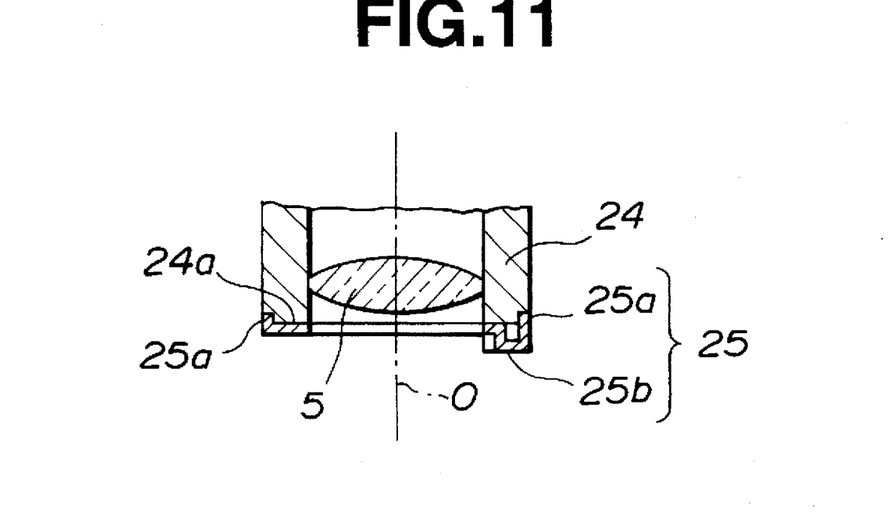
FIG. 11 is a cross-sectional view of the lens mount of FIG. 10.

FIG. 10 is an exploded perspective view showing the lens mount and the projection member according to the alternate example, and FIG. 11 is the cross-sectional view showing the end portion of the lens mount.

As shown in FIGS. 10 and 11, the lens mount 24 is, for example, the one that is retractably supported by the lens mount 13 of the second embodiment, and the lens mount 24 holds the front imaging lens 5. The main structure of the lens mount 24 is provided with a stepped end portion 24a. The stepped end portion 24a is mated with the ring portion 25a of a lens mount decorative member 25 with which a projection 25b is integrally formed.

The lens mount decorative member 25 is manufactured by drawing a sheet of metal as thick as 0.2 mm or so.

When the lens mount 24 having the lens mount decorative member 25 with the projection 25b is assembled into the camera of the second embodiment in FIG. 6, the front end of the projection 25b is exposed to the outside with the barrier 12 at its closed position.

The rest of the construction remains unchanged from the collapsible-type camera of the second embodiment.

According to the alternate embodiment with the lens mount decorative member 25 employed as above, the lens mount 24 itself is of a regular structure without a projection and is thus easy to manufacture. The lens mount decorative member 25 may be separately pigmented on an individual basis. The projection 25b may be formed by drawing process.

A wide range of options is permitted in the choice of the color of the lens mount decorative member 25, and thus more freedom is permitted in camera design.

As an alternative to the above example that employs the lens mount 24 with the lens mount decorative member 25, the projection 25b only may be fitted into the end portion of the lens mount. In this case, the cost for the decorative member is eliminated and the pigmentation of the projection is easier than the pigmentation of the decorative member with the projection, and the freedom of design is further widened.

The description of each of the embodiments and their alternate examples assumes that the camera is of a collapsible lens-mount type. The present invention is not limited to this type of camera. The barrier structures with reference to the embodiments and their alternate examples may be applied to a single-focus fixed lens mount type, a non-collapsible zoom lens mount type, a non-retractable lens mount type and the like.

What is claimed is:

1. A camera comprising:

a camera body, an imaging lens mount disposed on a front of the camera body and having an imaging optical system, and barrier means mounted on the camera body in a manner that the barrier means is shiftable between a first extreme position where the barrier means completely covers a front of the imaging optical system and partly covers a front of the imaging lens mount leaving a portion of the front of the lens mount exposed and a second extreme position where the barrier means is clear of the front of the imaging lens mount and the imaging optical system.

2. The camera according to claim 1, wherein when said barrier means is at the first extreme position, the barrier means fully covers all optical elements of the imaging optical system disposed at a front of the imaging lens mount, and when the barrier means is at the second extreme position, the front of the imaging lens mount is fully exposed.

3. A camera comprising:

a camera body, an imaging lens mount disposed on a front of the camera body and having a movable imaging optical system, said imaging lens mount being retracted into the camera body during a non-photographing state, and being projected externally out of the camera body during a photographing state, barrier means mounted on the camera body in a manner that the barrier means is shiftable between a first extreme position where the barrier means completely covers a front of the imaging optical system and partly covers a front of the imaging lens mount leaving a portion of front surface of the lens mount exposed when the lens mount is retracted and a second extreme position where the barrier means is clear of the front of the imaging lens mount and the imaging optical system to permit the lens mount to be projected.

4. The camera according to claim 3, wherein the lens mount is retracted during the non-photographing state and is projected during the photographing state or ready-for-use state.

5. The camera according to claim 3, wherein said imaging optical system is a variable focal length optical system.

6. A camera comprising:

a lens mount having an imaging lens movable relative to a camera body between a projected position where photographing is performed and a collapsed position where no photographing is performed, and a barrier disposed on the camera body and movable between two extreme positions, namely a closed position where the barrier covers a front of the imaging lens and partly covers a front of the lens mount and an open position where the barrier is clear of the front of the imaging lens and the lens mount, whereby one side of the barrier is positioned adjacent to one side of the lens mount when the barrier is in the open position and is positioned so that a portion of the front of the lens mount on another side of the lens mount opposite said one side of the lens mount is exposed when the barrier is at the closed position.

7. The camera according to claim 6, wherein the portion of the front of the lens mount that is exposed when the barrier includes at the closed position includes a projection extending away from the camera body.

8. The camera according to claim 7, wherein the projection on the front of the lens mount is an integral part of the lens mount.

9. A camera comprising:

a lens mount having an imaging lens movable relative to a camera body between a projected position where photographing is performed and a collapsed position where no photographing is performed, and a barrier disposed on the camera body and slidable in a direction approximately perpendicular to an optical axis of the lens mount between two extreme positions, namely, a closed position where the barrier covers a front of the imaging lens and partly covers a front of the lens mount and an open position where the barrier is clear of the front of the imaging lens and a front of the lens mount, whereby the barrier has a side which is adjacent to one side of the lens mount in the open position and which leaves a portion of the front of the lens mount on another side of the lens mount opposite said one side of the lens mount to be exposed when the barrier is at the closed position.

10. A camera comprising:

a lens mount having an imaging lens and movable relative to a camera body between a frontwardly projected position out of the camera body and a retracted position drawn into the camera body, and a barrier disposed on the camera body and movable between two extreme positions, namely a closed position where the barrier covers a front of the imaging lens and partly covers a front of the lens mount and an open position where the barrier is clear of the front of the imaging lens and the front of the lens mount, whereby the barrier has a side which is adjacent to one side of the lens mount in the open position and which leaves a portion of the front of the lens mount on another side of the lens mount opposite said one side of the lens mount exposed when the barrier is at the closed position.

11. A camera comprising:

a lens mount having an imaging lens movable relative to a camera body between a projected position where photographing is performed and a collapsed position where no photographing is performed, an imaging lens opening which is disposed on the lens mount and through which a front of the imaging lens is exposed, and a barrier disposed on the camera body and slidable in a direction approximately perpendicular to an optical axis of the lens mount between two extreme positions namely a closed position where the barrier covers the imaging lens opening, while leaving a part of a front of the lens mount exposed, and an open position where the barrier is clear of the front of the lens mount and the front of the imaging lens, said barrier being positioned to one side of the lens mount in the open position, the part of the lens mount which is exposed when the barrier is in the closed position being opposite said one side of the lens mount.

12. A camera comprising:

a lens mount having an imaging lens movable relative to a camera body between a projected position where photographing is performed and a collapsed position where no photographing is performed, an imaging lens opening which is disposed on the lens mount and through which a front of the imaging lens is exposed, a barrier disposed on the camera body and slidable in a direction approximately perpendicular to an optical axis of the lens mount between two extreme positions, namely a closed position where the barrier covers the imaging lens opening with a part of a front of the lens mount exposed and an open position where the barrier is clear of the front of the imaging lens and the lens mount, said barrier being positioned to one side of the lens mounting in the open position, the part of the lens mount which is exposed when the barrier is in the closed position being opposite said one side of the lens mount; and a member mounted on the lens mount and having a projection that corresponds to the exposed part of the front of the lens mount.

13. The camera according to claim 12, wherein a portion of a surface of the projection of the lens mount front being adjacent to and flush with a portion of an outer surface of the barrier when the barrier is at the closed position.

14. The camera according to claim 12, wherein the projection of the lens mount front is an integral part of the lens mount.

15. The camera according to claim 12, wherein the projection of the lens mount has an elevation that prevents the projection of the lens mount from touching a flat surface when the camera with the barrier at the closed position is rolled over on the flat surface.

16. The camera according to claim 12, wherein projection of the lens mount is of a color which is different from a color of any of the camera body and the barrier.

17. The camera according to claim 12, wherein the projection of the lens mount is a component formed of a sheet of metal.

18. The camera according to claim 17, wherein the component of the sheet of metal is made by drawing a sheet of metal to a predetermined thickness.

19. The camera according to claim 12, wherein a portion of a surface of the projection of the lens mount front is adjacent to and flush with a portion of an outer surface of the camera body when the lens mount is collapsed.

20. A camera comprising:

a lens mount having an imaging lens and movable relative to a camera body between a projected position where photographing is performed and a collapsed position where no photographing is performed, and a barrier disposed on the camera body and slidable in a direction transverse to an optical axis of the lens mount between two extreme positions, namely a closed position where the barrier covers a front of the imaging lens and partly covers a front of the lens mount and an open position where the barrier is clear of the imaging lens and the front of the lens mount, whereby a slide distance of the barrier between said two extreme positions is less than an outer diameter of the movable lens mount whereby a portion of a front of the lens mount is exposed when the barrier is in the closed position.

21. A camera having a lens mount and an imaging lens arranged in a central portion of a front of the camera;

a barrier arranged on the front of the camera and movable between two extreme end positions wherein a first of the extreme end positions fully exposes the imaging lens and a second of the extreme end positions fully covers the imaging lens, said barrier having a side edge displaced from one side of an outer periphery of said lens mount when in the first extreme position and partially covering a portion of a barrel of the lens mount surrounding said imaging lens and exposing a portion of the barrel which is on a side of the imaging lens furthest removed from said barrier side edge when the barrier is in the second extreme position.

22. The camera according to claim 21, wherein said imaging lens is a lens having a variable focal length capability.

23. The camera according to claim 21 or 22, wherein said lens mount is movable between a ready position where the camera is ready for use and a collapsed position where the camera is not ready for use, and the barrier is shiftable to the second extreme position the lens mount is at the collapsed position.

24. The camera according to claim 21, wherein said lens mount has a projection which extends forwardly from said lens mount and has a forward end that exposed even when the barrier is at the second extreme position.

25. The camera according to claim 24, wherein a free end of said projection lies within an exterior surface of the camera adjacent to the projection when the imaging lens is collapsed and the barrier is at the second extreme position.

26. A camera according to claim 25, wherein a front end of said projection is positioned between and recessed below an exterior surface portion of the camera and an exterior surface portion of the barrier, the exterior surface portion of the camera being a portion of a front cover.

27. A camera according to claim 25, wherein said projection is positioned between and flush with an exterior surface portion of the camera and an exterior surface portion of the barrier, the exterior surface portion of the camera being a portion of a front cover.

28. A camera according to claim 6 wherein said projection has a curved configuration conforming to a curvature of the lens mount.

29. The camera according to claim 28, wherein said barrier is slidable along the front of the camera in a direction approximately perpendicular to the optical axis of the imaging lens.

* * * * *

UNITED STATES PATENT AND TRADEMARK OFFICE
CERTIFICATE OF CORRECTION

PATENT NO. : 5,701,533
DATED : December 23, 1997
INVENTOR(S) : Suzuki et al.

It is certified that error appears in the above-identified patent and that said Letters Patent is hereby corrected as shown below:

Col. 3, line 30, after "turn" insert --retractably--.
Col. 3, line 31, delete "retractably".
Col. 10, line 12, after "that" insert --is--.
Col. 10, line 27, delete "claim 6" and insert --claim 24--.

Signed and Sealed this

Eighth Day of June, 1999

Attest:

Q. TODD DICKINSON

Attesting Officer

Acting Commissioner of Patents and Trademarks